(12) United States Patent
Brink

(10) Patent No.: US 10,360,130 B2
(45) Date of Patent: Jul. 23, 2019

(54) SYMBOL TABLES FOR PROCESSING HIERARCHICAL DATA STRUCTURES IN DATA FLOW ANALYSIS

(71) Applicant: SAP SE, Walldorf (DE)

(72) Inventor: Ulrich Brink, Nussloch (DE)

(73) Assignee: SAP SE, Walldorf (DE)

( * ) Notice: Subject to any disclaimer, the term of this patent is extended or adjusted under 35 U.S.C. 154(b) by 513 days.

(21) Appl. No.: 14/717,433

(22) Filed: May 20, 2015

(65) Prior Publication Data
US 2016/0342498 A1    Nov. 24, 2016

(51) Int. Cl.
G06F 9/44        (2018.01)
G06F 11/36       (2006.01)
G06F 21/57       (2013.01)

(52) U.S. Cl.
CPC ........ *G06F 11/3604* (2013.01); *G06F 21/577* (2013.01); *G06F 2221/033* (2013.01)

(58) Field of Classification Search
CPC .................................................. G06F 11/3604
USPC ......................................................... 717/132
See application file for complete search history.

(56) References Cited

U.S. PATENT DOCUMENTS

| | | | | |
|---|---|---|---|---|
| 6,829,760 B1 * | 12/2004 | Bera | ................... | G06F 9/44521 717/142 |
| 7,720,848 B2 * | 5/2010 | Guerraz | ............... | G06K 9/6219 707/737 |
| 8,225,271 B2 * | 7/2012 | Eldridge | ................ | G05B 15/02 717/100 |
| 2008/0120129 A1 * | 5/2008 | Seubert | .................. | G06Q 10/06 705/35 |
| 2013/0179419 A1 * | 7/2013 | Hsu | ................... | G06F 17/30327 707/706 |
| 2014/0359776 A1 * | 12/2014 | Liu | ........................ | G06F 21/577 726/25 |
| 2015/0312054 A1 * | 10/2015 | Barabash | ............ | H04L 12/4633 370/392 |
| 2015/0363478 A1 * | 12/2015 | Haynes | ................ | G06Q 10/101 707/625 |
| 2016/0275588 A1 * | 9/2016 | Ye | .......................... | G06F 3/0488 |
| 2016/0321218 A1 * | 11/2016 | Farncombe | ........... | G06F 17/227 |

* cited by examiner

*Primary Examiner* — Lewis A Bullock, Jr.
*Assistant Examiner* — Mohammad H Kabir
(74) *Attorney, Agent, or Firm* — Schwegman Lundberg & Woessner, P.A.

(57) ABSTRACT

Disclosed are a system, a computer-readable storage medium storing at least one program, and a computer-implemented method of code analysis. Whether a destination ancestor of a destination data structure and the destination data structure are included in a live data table is determined. Also, whether a destination leaf-descendant of the destination data structure is included in a live descendant data table is determined. In response to either the destination ancestor or the destination data structure being included in the live data table, the live data table is updated to include the source data structure. In response to the destination leaf-descendant being included in the live descendant data table, the live data table and a symbol data table are updated to include a leaf-descendant of the source data structure that corresponds to the destination leaf-descendant. The symbol data table is provided to a data flow analyzer.

20 Claims, 10 Drawing Sheets

US 10,360,130 B2

SYMBOL TABLES FOR PROCESSING HIERARCHICAL DATA STRUCTURES IN DATA FLOW ANALYSIS

TECHNICAL FIELD

This document generally relates to the analysis of computer code. More specifically, this document relates to code analysis using data flow analysis.

BACKGROUND

Static code analysis is the analysis of computer software performed without actually executing the software being analyzed. The term is usually applied to the analysis performed by an automated tool. The analyses performed by these tools vary from those that only consider the behavior of individual statements and declarations to those that include an analysis of the complete source code of a program. Modern static check tools can be integrated into a development environment. Such an integration might, for example, highlight flawed code while it is being typed. Such early feedback aids in improving quality and reducing costs.

BRIEF DESCRIPTION OF DRAWINGS

The present disclosure is illustrated by way of example and not limitation in the figures of the accompanying drawings, in which like references indicate similar elements and in which.

DETAILED DESCRIPTION

The description that follows includes illustrative systems, methods, techniques, instruction sequences, and computing machine program products that embody illustrative embodiments. In the following description, for purposes of explanation, numerous specific details are set forth in order to provide an understanding of various embodiments of the inventive subject matter. It will be evident, however, to those skilled in the art, that embodiments of the inventive subject matter can be practiced without these specific details. In general, well-known instruction instances, protocols, structures, and techniques have not been shown in detail.

Static code analysis detects and eliminates security vulnerabilities in computer software. In example embodiments described herein, static code analysis comprises data flow analysis that identifies data flow from untrusted sources to security-relevant statements. To this end, in operation, static code analysis can sometimes analyze a large number of procedures with a large number of structured data objects. Furthermore, each data object can have a large number of components, also called children.

A priori, a static code analyzer may not know which of these data objects and which of their children occur in the data flow paths being computed. In example embodiments disclosed herein, mechanisms use a dynamically growing symbol table to handle analyzing a large number of procedures with a large amount of structured data. For instance, it may be computationally burdensome to use an approach that uses a symbol table that contains all children that can potentially occur in such a path. Such a symbol table can be large, which would lead to a poor performance. Instead, example embodiments insert those leaf children that can impact the static code analysis.

While it will be described herein that the symbol information itself is obtained from an advanced business application programming (ABAP) compiler, it will be nonetheless appreciated that embodiments disclosed herein can be suitable for global analysis of computer programs even where the ABAP compiler analyzes the code only locally.

Figure 1:
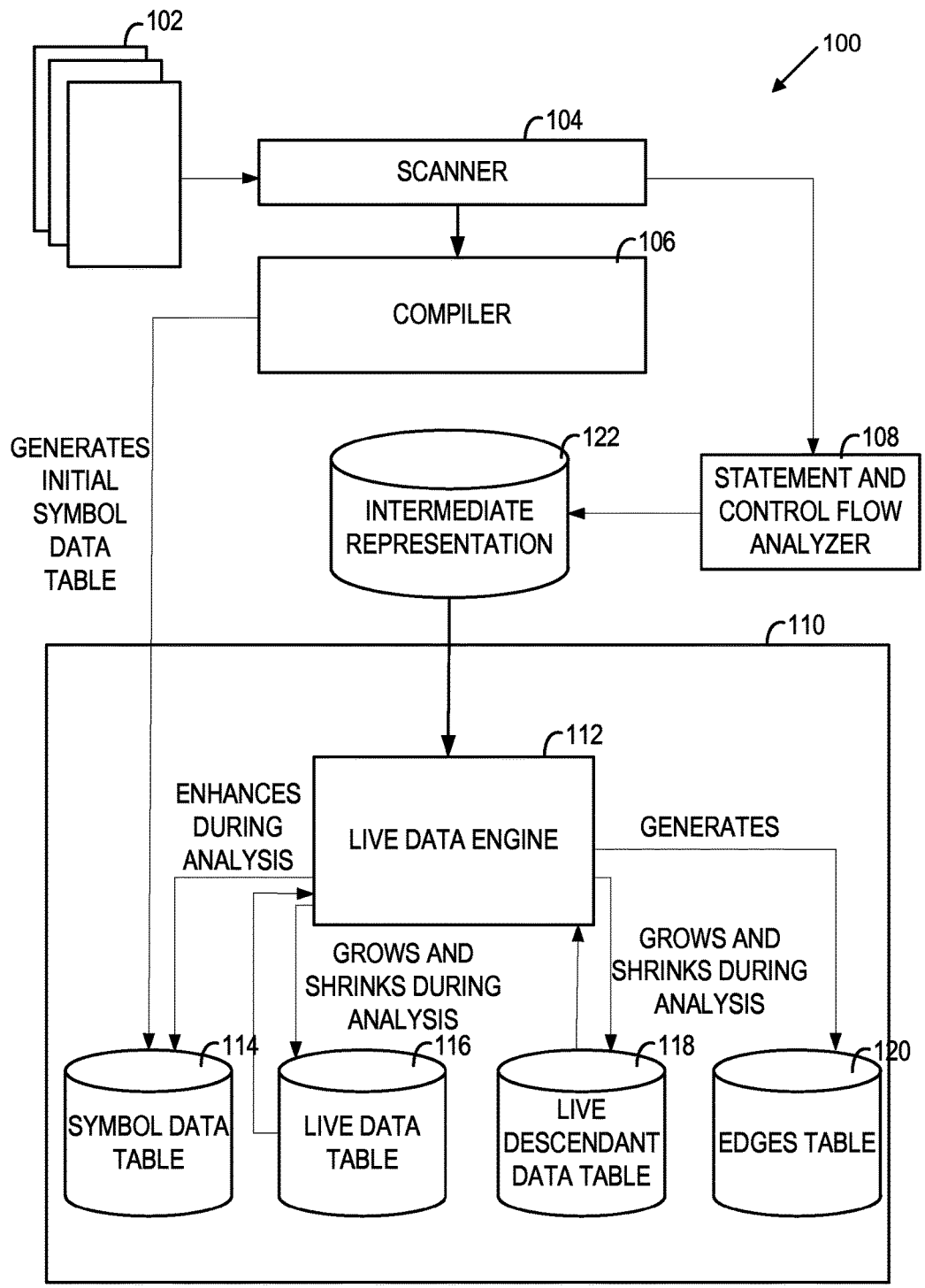
FIG. 1 is a block diagram illustrating a code analysis system, in accordance with an example embodiment.

FIG. 1 is a block diagram illustrating a code analysis system 100, in accordance with an example embodiment. In particular, the code analysis system 100 includes source code 102, scanner 104, compiler 106, statement and control flow analyzer 108, and a static code analyzer 110 that includes a live data engine 112. Furthermore, the live data engine 112 is interfaced with a symbol data table 114, a live data table 116, a live descendant data table 118, and an edges table 120. It will be appreciated that in alternative example embodiments, the static code analyzer 110 may include additional or fewer components. For instance, in one example embodiment, the static code analyzer 110 additionally includes a control flow analyzer module for performing aspects of static code analysis.

In operation, the scanner 104 receives as input the source code 102 that is to be analyzed for errors and/or vulnerabilities. It should be noted that in some example embodiments, the source code may include development objects not expressed in textual format, while in other embodiments it may include development objects that are expressed in textual format. Vulnerabilities can be related to, but are not limited to, aspects of performance, stability, and/or security. Compiler 106 generates an initial symbol data table 114 from the source code 102. The statement and control flow analyzer 108 processes the source code 102 and generates output code, such as intermediate representation 122, that is in a format suitable for processing by the static code analyzer 110. An intermediate representation of source code is source code that has been processed into a simpler form.

Additionally or alternatively, as will be described in greater detail later in connection with FIGS. 6-9, the live data engine 112 receives the intermediate representation 122 as an input. Furthermore, the live data engine 112 processes its input, analyzes it, and enhances the symbol data table 114. To this end, the live data engine 112 generates the live data table 116 the live descendant data table 118 and the edges table 120 for facilitating the enhancing of the symbol data table 114. The live data table 116 and live descendant data table 118 can grow and shrink during the analysis. The symbol data table 114, live data table 116, and live descendent data table 118 will be described in greater detail later in connection with FIGS. 3-5.

In example embodiments, the code analysis system 100 may be utilized to analyze software projects deploying a number of types of data objects, such as, for example, ABAP development objects. For instance, the compiler 106 can correspond to an ABAP compiler that generates ABAP data objects defined by the source code 102. However, for purposes of this disclosure, the disclosed embodiments should not be limited to ABAP embodiments and generally should be interpreted broadly so as to include any suitable integrated development environment.

Figure 2:
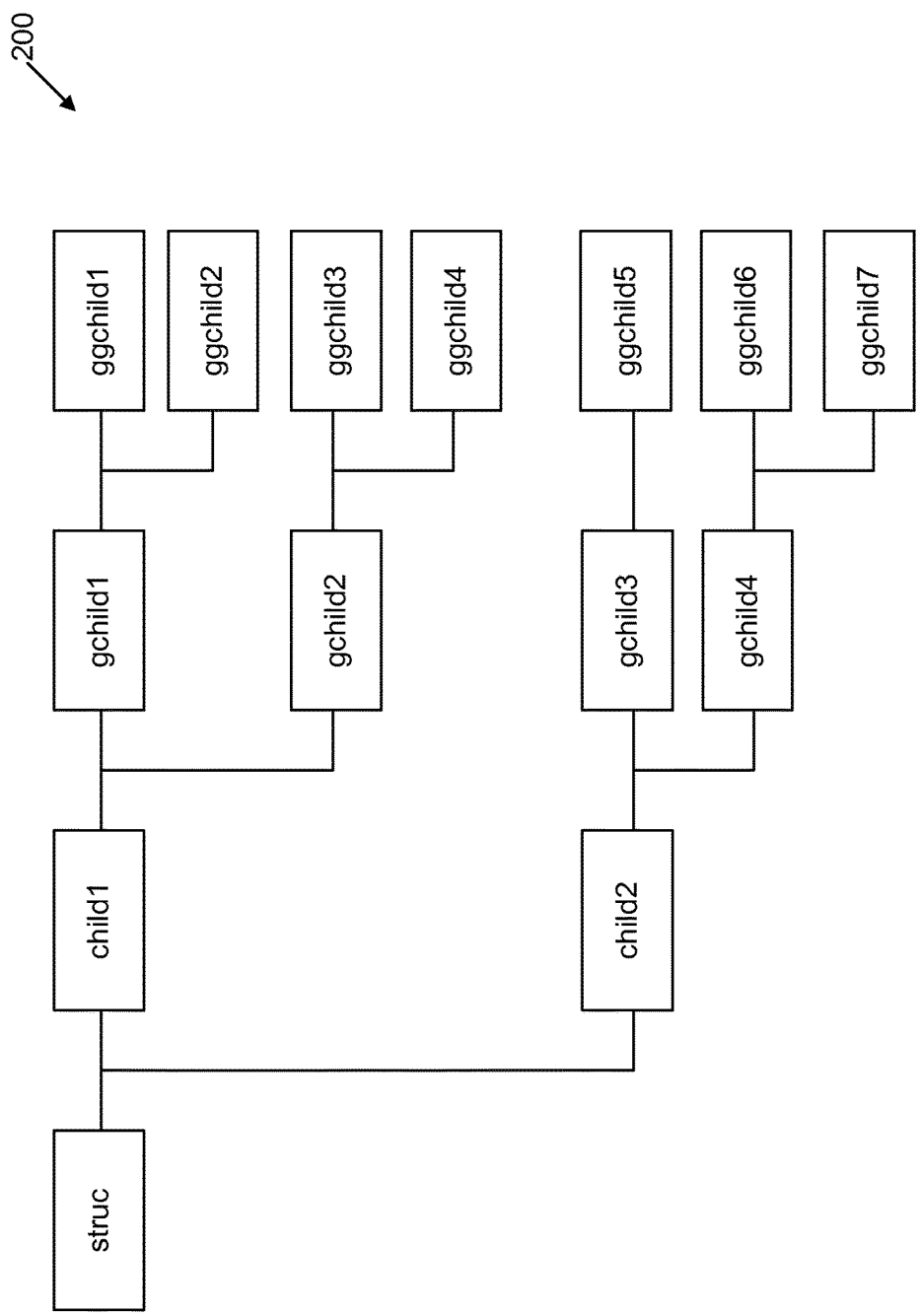
FIG. 2 is a block diagram illustrating an example data structure, in accordance with an example embodiment, used within the code analysis system of FIG. 1.

FIG. 2 is a block diagram illustrating an example data structure 200, in accordance with an example embodiment, used within the code analysis system of FIG. 1. For example, the data structure 200 can correspond to a data object within the output code produced by the compiler 106 and processed by the live data engine 112 of FIG. 1.

Examples of data structures include data objects that include one or several components. These components are called children, and data structures are sometimes called aggregates. The descendants of a structure are its children and the descendants of the children. The ancestors of a child are its parent and the ancestors of the parent. A leaf child is a child that has no children itself.

Accordingly, in the example embodiment shown in FIG. 2, the data structure 200 has a parent component struc with two children, child1 and child2, and further descendants. That is, child1 has descendants children gchild1, gchild2, ggchild1, ggchild2, ggchild3, and ggchild4; child1 has an ancestor struc; child2 has descendants gchild3, gchild4, ggchild5, ggchild6, and ggchild7; and child2 has an ancestor struc. Moreover, the components ggchild1, ggchild2, ggchild3, ggchild4, ggchild5, ggchild6, and ggchild7 correspond to leaf children. In an example, child child1 can be accessed using ABAP by the expression struc-child1 and so forth.

In example embodiments, the intermediate representation can include, among others, the following instructions:

MOVE: A MOVE transfers content from one symbol to another. An assignment statement A=B results in a MOVE from B to A in the intermediate representation.

CLEAR: A CLEAR deletes the content of a symbol, thus interrupting any data flow.

ALIAS: This instruction sets a pointer to a symbol. The symbol can then be accessed via the pointer. Several pointers can point to the same symbol. During the analysis, a pointer can potentially point to several symbols at the same time.

UNALIAS: This instruction clears a pointer, i.e., the pointer no longer points to any symbol.

CALL: A procedure is called.

The ABAP statement MOVE-CORRESPONDING struc1 TO struc2 determines for all children of struc1 whether struc2 has a child with the same name; if this is the case, the content of the struc1 child is transferred to the struc2 child.

If struc1 and struc2 are structures of different data types, the effect of the assignment statement struc2=struc1 depends on the memory layout of the structures. This is in contrast to the MOVE-CORRESPONDING statement and does not need to be further detailed here.

For an assignment statement A=B, if A is live after this statement, then B is live before this statement, while A is not live before this statement.

It is possible to distinguish between the two cases that (A) an entire structure or (B) some (or all) of its children are live. If the entire structure is live, this is just one entry in the live data table 116, which can improve performance of data flow analysis. However, the entire structure and some (or all) of its children can be live at the same time, with potentially different paths leading to different target symbols.

Below, example algorithms are described in terms of structures and children. The algorithm also works for the following ABAP constructs:

So-called includes: All components of the included structure are added to the including structure as individual components without forming a substructure. Optionally, a name for the included structure can be supplied and the components can then be accessed as if there was a substructure with this name.

Boxed components: These are substructures that facilitate sharing of content. This means that for two structures of the same type, the content of the boxed components is stored only once in the memory as long as this content is identical. This can lead to considerable savings in terms of memory space.

Internal tables: The row type of an internal table is (in general) a structure type, i.e., the columns of the table correspond to the components of the structure type. The columns of the table are the entities that are relevant in the data flow analysis. Note that it is hardly possible to analyze which rows of an internal table might contain untrusted data because this would require tracking the content of the key fields.

Attributes of objects (in object-oriented ABAP) are treated similarly to components of structures in that the objects are viewed as structures.

Figure 3:
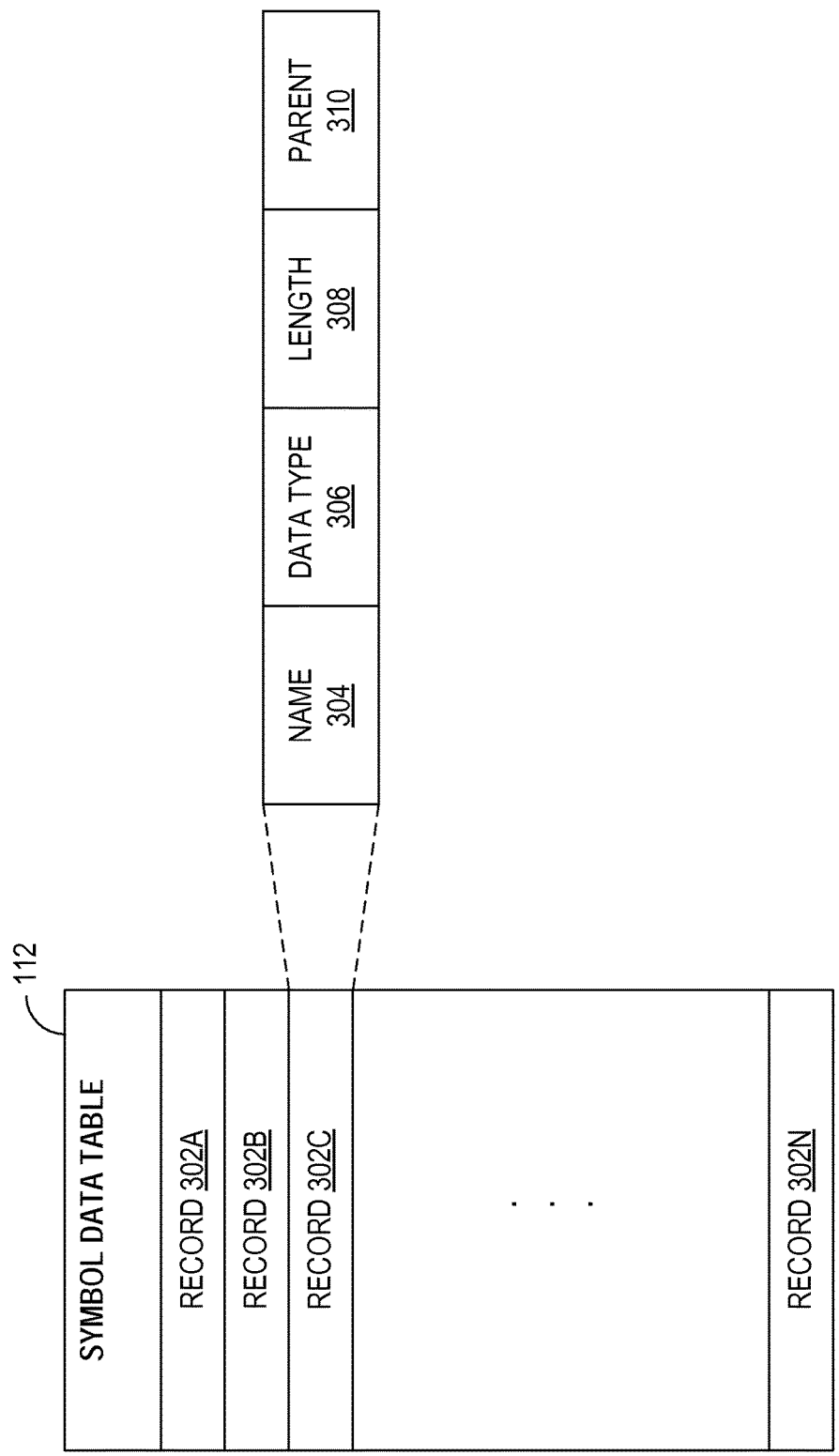
FIGS. 3-5 are block diagrams illustrating data tables, in accordance with example embodiments, used within the code analysis system of FIG. 1.
Figure 4:
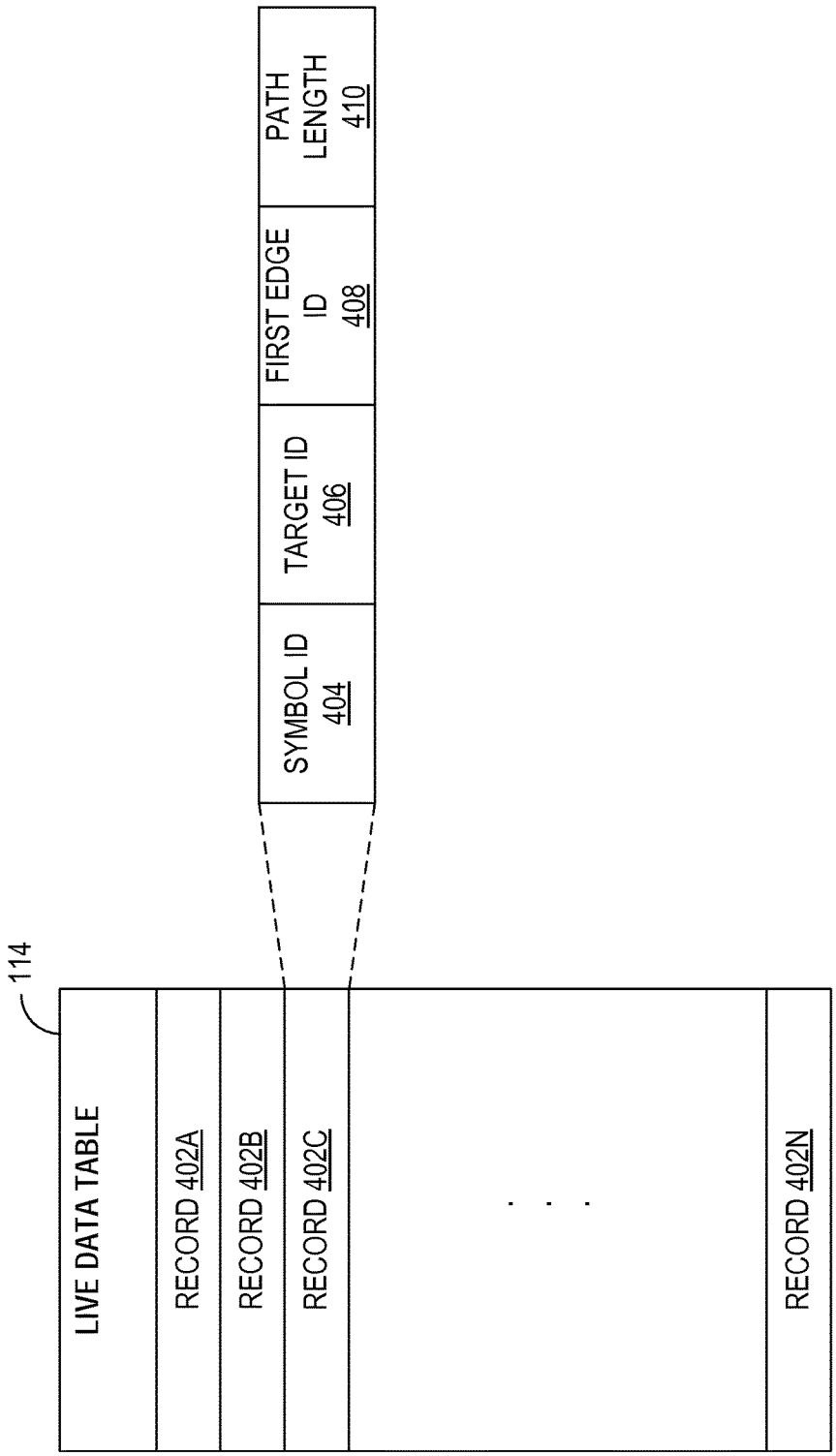
Figure 5:
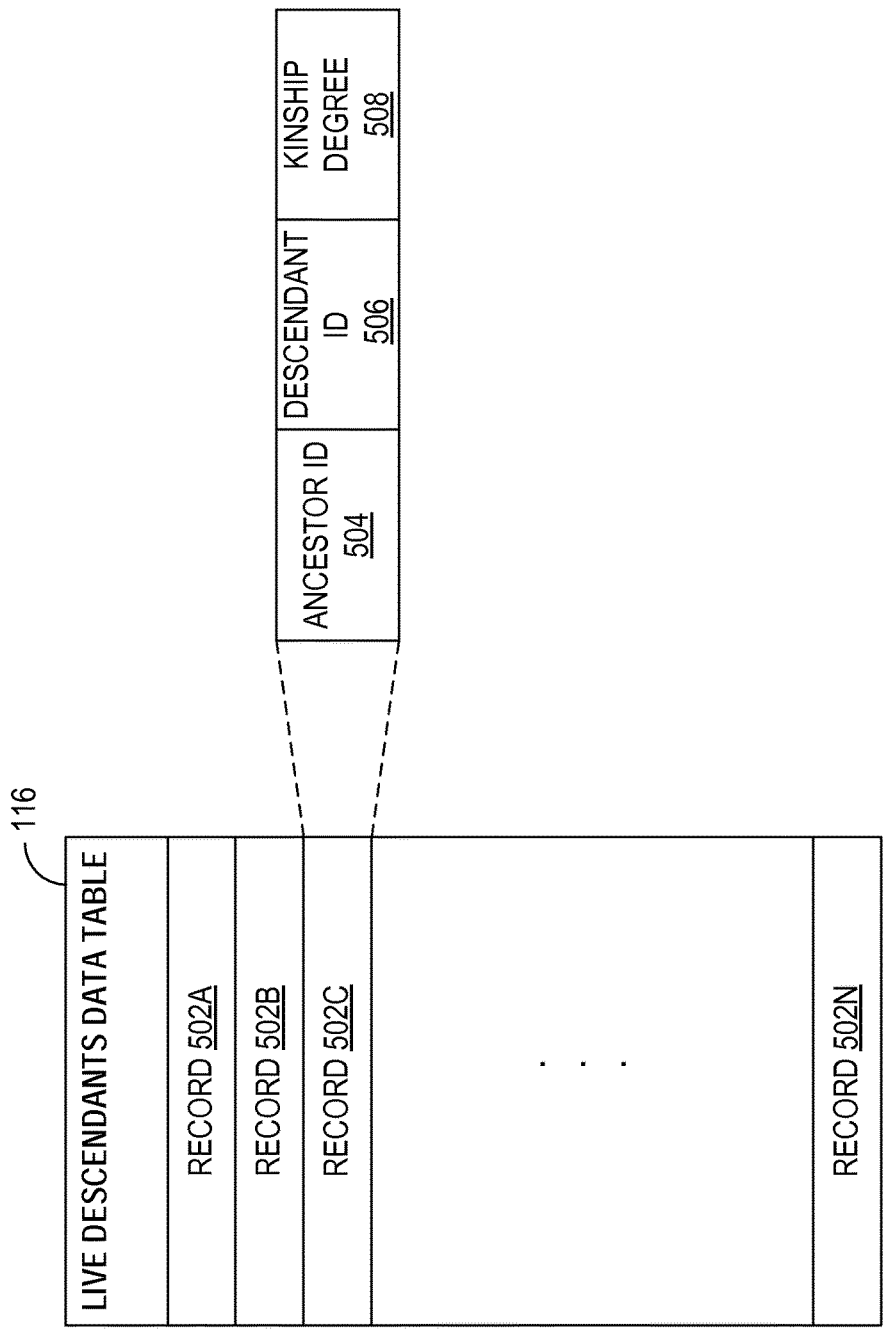

FIGS. 3-5 are block diagrams illustrating data tables 114, 116, 118, in accordance with example embodiments, used within the code analysis system 100 of FIG. 1.

Referring to FIG. 3, the symbol data table 114 includes a number of records 302A-N to represent the data objects of the output code of the compiler 106 and is used by the data flow analyzer 110. As stated, the live data engine 112 adds additional entries to the symbol data table 114.

The symbol data table 114 includes a record (such as one of the records 302A-N) for symbols of the output code of the compiler 106. For example, structured data objects and their children are represented by symbols. More generally, each named variable within the source code corresponds to a symbol, and there are further symbols that have no counterpart in the source code.

Each of the records 302A-N comprise a number of data fields. In the illustrated embodiment, a name data field 304, a data type data field 306, a length data field 308, and a parent data field 310. The name data field 304 identifies a variable named in the source code 102. The data type data field 306 identifies the data type of the corresponding data object. The length data field 308 represents the size of the corresponding data object (e.g., the number of characters if the data type is character-like). The parent data field 310 identifies the parent symbol if the corresponding data object is a child.

Now referring to FIG. 4, the live data table 116 includes a number of records 402A-N (e.g., N can be different from the N of FIG. 3) to represent symbols that are "live" at various positions during the traversal of the intermediate representation.

A symbol is live at a point of a control flow graph if there is a data flow path that passes content to a target symbol in a security-relevant statement. Target symbols are symbols that are read by security-relevant statements and may pose a security risk if there is untrusted content in the symbol. An example is the file name in a statement that opens a file; if the file name contains unverified user input, this may give rise to a so-called directory traversal. Another example is a dynamic WHERE clause in an SQL statement, which may allow an SQL injection.

Each record in the live data table 116 includes a symbol identifier data field 404, a target identifier data field 406, a first edge identifier 408, and a path length data field 410. In an example embodiment, the symbol identifier data field 404 is a number (e.g., an integer) that is usable to identify a symbol within the intermediate code. The target identifier data field 406 is a number (e.g., an integer) that is usable to identify a target symbol that is at the end of the data flow path.

The first edge identifier 408 is a number (e.g. integer) that is usable to identify a first edge of the path of the symbol identified by the symbol identifier data field 404. An edge connects two statements of computer code (e.g., source code or intermediate code), where the first statement writes some content into a symbol and the second statement reads this content. Further, there is a control flow path from the first to the second statement, e.g., the second statement is possibly executed after the first one. If some content is passed from some statement to another statement along one or several subsequent edges, these edges form a data flow path, which is for brevity often just called a path. Edge data can be stored in a separate edge data table (not shown).

In an example embodiment, edges further than the first edge of the path are not stored in the data table 116 because each edge has a pointer to the subsequent edge (e.g., thereby forming a linked list). The path length data field 410 represents the length of the path corresponding to the first edge identifier 408.

Now turning to FIG. 5, the live descendant data table 118 includes a number of records 502A-N (e.g., N can be different from the indicia N of FIGS. 3 and 4) representing pairs of ancestors and descendants. For example, the ancestors of a live symbol are stored in the live descendant data table 118 (in conjunction with the corresponding live symbol) even if these ancestors are not themselves marked as being live.

Each record 502A-N of the data table 118 comprises an ancestor identifier data field 504, a descendant identifier data field 506, and a kinship degree data field 508. In an example embodiment, the ancestor identifier data field 504 is a number (e.g., an integer) that is indicative of the ancestor symbol of the corresponding live symbol. The descendant identifier data field 506 is a number (e.g. integer) that is indicative of the corresponding live symbol, which, as stated, is a descendant of the symbol identified by the ancestor identifier data field 504. The kinship degree data field 508 is a number that indicates the degree of kinship between the ancestor symbol and the live symbol.

The ancestor identifier data field 504 and the descendant identifier data field 506 together form a unique primary key. There is a non-unique secondary key on the descendant identifier data field 506 to facilitate efficient access if a descendant is given.

As stated, the live data table 116 and the live descendant data table 118 together serve to keep track of those symbols that are live, even in the presence of arbitrarily nested structures. In example embodiments, using integer-based data fields as described above, the use of these tables is efficient because the tables solely contain integer numbers.

Figure 6:
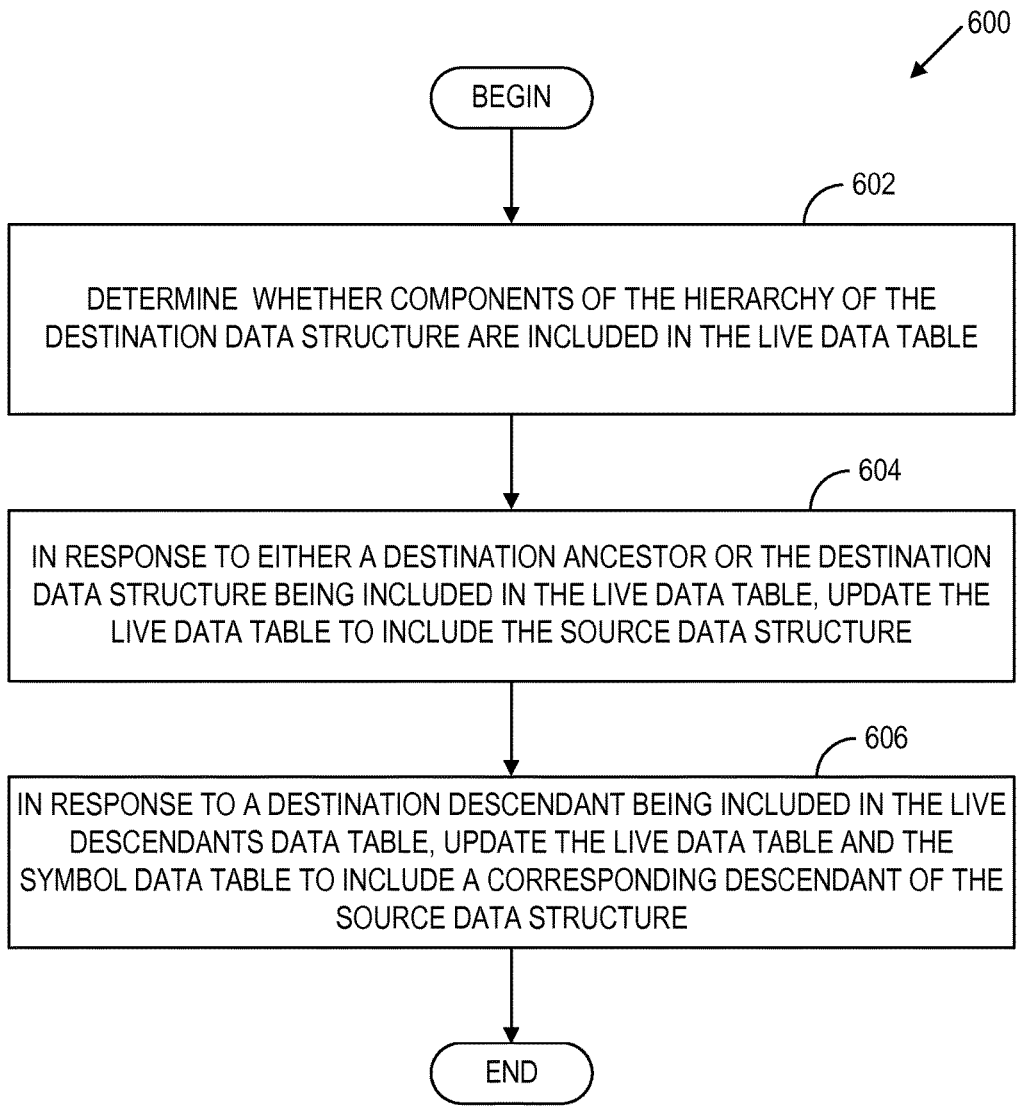
FIG. 6 is a flow diagram illustrating a method, in accordance with an example embodiment, of performing data flow analysis.

FIG. 6 is a flow diagram illustrating a method 600, in accordance with an example embodiment, of performing data flow analysis. The data flow analysis traverses the intermediate representation backwards (i.e., in the opposite direction of the control flow). In a preprocessing phase, the descendants that are not leaf children are entered into the symbol data table 114. Pointers have been analyzed and resolved in a previous phase (not shown). This is possible because a strictly typed programming language is used and the target symbols with potentially harmful content are not pointers (but typically are of a character type).

At block 602, in response to the live data engine 112 accessing a statement (e.g., of the intermediate code) affecting a destination data structure, the live data engine 112 determines whether components of the hierarchy of the destination data structure are included in the live data table 116 and/or the live descendant data table 118. The live data engine 112 accesses statements by traversing the intermediate representation backwards (i.e., in the opposite direction of the control flow).

In an example, the statement can include the destination data structure and a source data structure, such as an assignment statement. An example assignment statement is the statement: struc-child1=pstruc-child1. The left-hand side (struc-child1) corresponds to the destination data structure in that it is the destination of the data flow. The right-hand side (pstruc-child1) corresponds to the source data structure in that it is the source of the data flow.

The source and destination data structures each have a hierarchy of an ancestor and descendant components that define the data structures, such as was described in connection with FIG. 2. The destination and source data structures have related hierarchies (e.g., the structure of the ancestors and descendant components of the source and destination data structures at least partially match).

As stated, the live data engine 112 determines whether components of the hierarchy of the destination data structure are included in the live data table 116 and/or the live descendant data table 118. For example, the live data engine 112 makes a determination that the destination data structure is live by checking the live data table 116 for the symbol of the destination data structure. Additionally or alternatively, the live data engine 112 makes a determination that one or more of the ancestors of the destination data structure are live by checking the live data table 116 for the symbol of the corresponding ancestor of the destination data structure. If the component is in the live data table 116, then the live data engine 112 makes a determination that the component is live. Otherwise, the live data engine 112 makes a determination that the destination data structure (or the ancestor of the destination data structure) is not live.

Additionally, the live data engine 112 makes a determination of whether any descendants of the destination data structure are live. In order to make this determination, the live data engine 112 checks whether the live descendant data table 118 includes a data structure-descendant pair. If the pair is included in the live descendant data table 118, the live data engine 112 makes a determination that the destination descendent is live. Otherwise, the live data engine 112 makes a determination that the destination descendent is not live.

At block 604, the live data engine 112, in response to either a destination ancestor or the destination data structure being included in the live data table 116, updates the live data table 116 to include the source data structure. At block 606, the live data engine 112, in response to each of the destination descendants being included in the live descendant data table 118, updates the live descendant data table 118 to include the corresponding descendant of the source data structure. Additionally, if the live destination descendant is also a leaf descendant, the live data engine 112 updates the symbol data table 114 to include the live leaf descendant.

Figure 7:
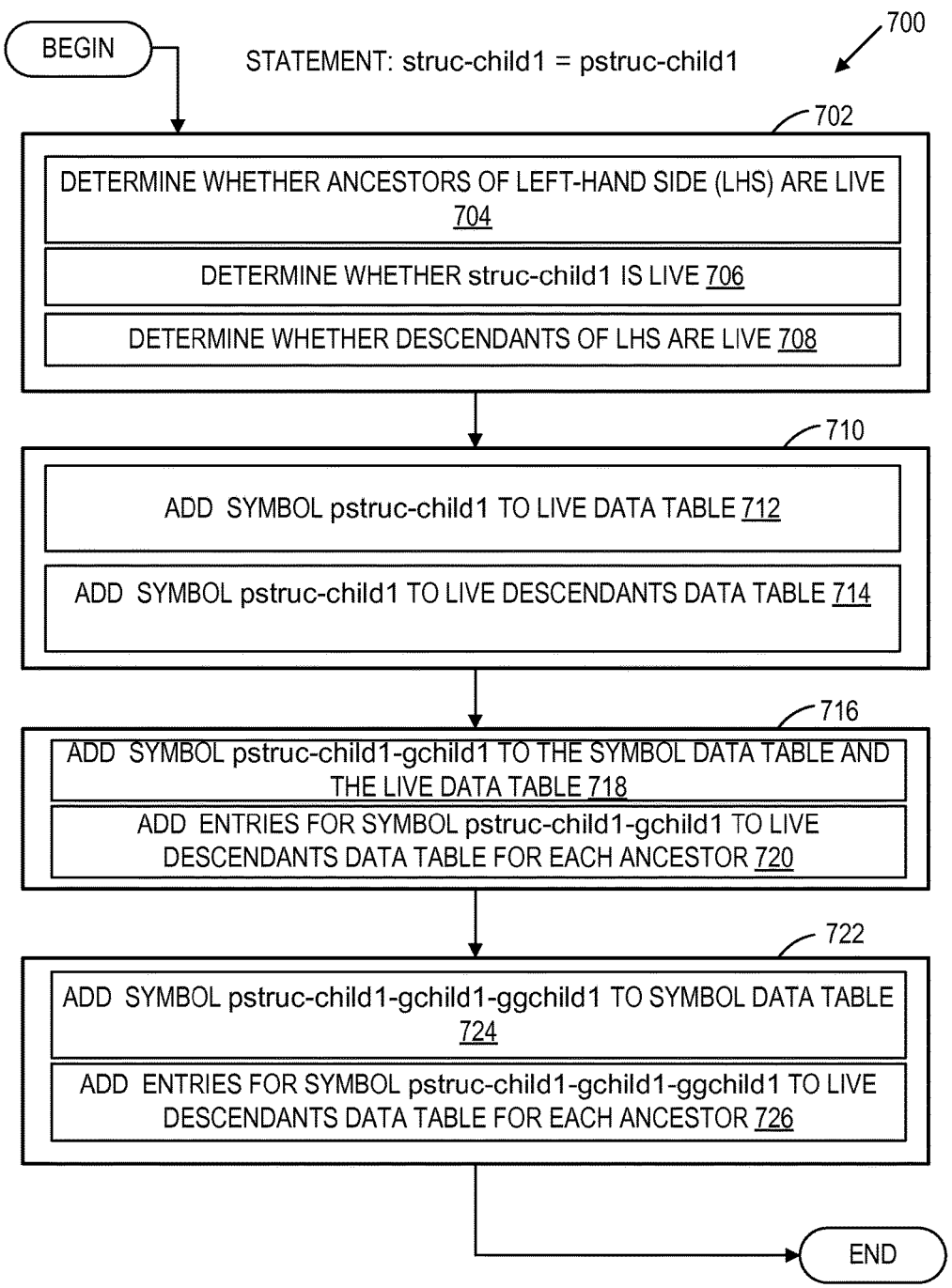
FIGS. 7-9 are flow diagrams illustrating methods, in accordance with example embodiments, of updating a symbol data table used within the code analysis system of FIG. 1.
Figure 8:
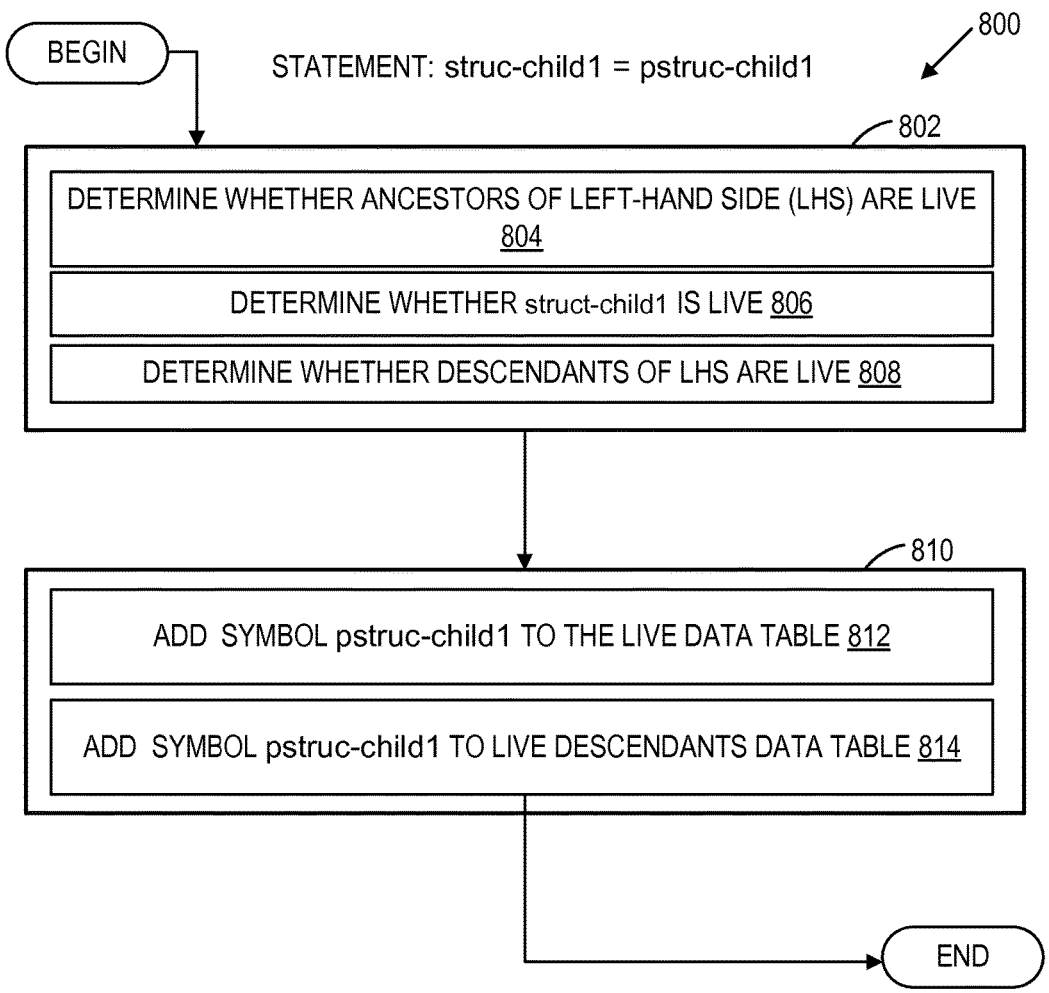

FIGS. 7 and 8 are flow diagrams illustrating methods, in accordance with example embodiments, of updating a symbol data table 114 used within the code analysis system 100 of FIG. 1. In particular, the flow diagrams shown in FIGS. 7 and 8 correspond to particular example processes deployed within the flow diagram of FIG. 6.

Throughout the descriptions of FIGS. 7 and 8, struc and pstruc are used as two example data structures. The data structure struc has the hierarchy of the data structure 200 shown in FIG. 2. The data structure pstruc has a child (child1) and additional children, which can be different for the two structures. Initially the symbol data table 114 includes only those leaf descendants that explicitly occur in the source code.

Regarding FIG. 7, method 700A includes blocks 602A, 604A, 712, and 606A as a particular example process deployed by method 600. In particular, the live data engine 112 accesses a MOVE instruction that is implied by an assignment statement struc-child1=pstruc-child1. Such an assignment statement can be used explicitly in the application code or may implicitly be part of some other ABAP statement. In the example of FIG. 7, struc-child1 and some of its descendants are live. More precisely, struc-child1 is live with a path to some symbol o_child; struc-child1-gchild1 is live with a path to some symbol o_gchild; struc-child1-gchild1-ggchild1 is live with a path to some symbol o_ggchild; and struc itself is not live. Accordingly, the symbols struc-child1, struc-child1-gchild1, and struc-child1-gchild1-ggchild1 are stored in the live data table 116. Additionally, each live symbol is stored in the live descendant data table 118 with each of its ancestors.

As described below in greater detail, when processing the assignment struc-child1=pstruc-child1, the live data engine 112 examines the symbol struc-child1 that is on the left-hand side (e.g., blocks 702-706). Then the live data engine 112 processes the symbol pstruc-child1 on the right-hand side (e.g., blocks 708-720).

In an example embodiment, the method 700 includes block 702 for performing blocks 704-708. At block 704, the live data engine 112 determines whether ancestors of the left-hand side are live by checking whether the live data table 116 includes the symbol struc. In this example, struc is not live and thus not included in the live data table 116. At block 706 of block 702, the live data engine 112 determines whether struc-child1 is live by checking whether the live data table 116 includes the symbol struc-child1. Here, struc-child1 is live. At block 708 of block 703, the live data engine 112 determines whether descendants of the left-hand side are live. For this purpose, the live data engine 112 checks whether the live descendant data table 118 includes entries for the descendants. Here, the descendants struc-child1-gchild1 and struc-child1-gchild1-ggchild1 are live and have corresponding entries in the live descendant data table 118.

The block 710 includes blocks 712 and 714. At block 712, the live data engine 112 adds the symbol pstruc-child1 to the live data table 116 in response to the determination that the symbol struc-child1 is live. As such, the symbol pstruc-child1 becomes live with a path to symbol o_child. At block 714, the live data engine 112 adds an entry to the live descendant data table 118 for the symbol pstruc-child1.

The block 716 includes blocks 718 and 720. At block 718, the live data engine 112 adds the symbol pstruc-child1-gchild1 to the live data table 116. For example, because the live data engine 112 determined that the symbol struc-child1-gchild1 of the LHS is live, the live data engine 112 adds to the live data table 116 an entry corresponding to the symbol pstruc-child1-gchild1 with a path to symbol o_gchild. It is noted that that the symbol pstruc-child1-gchild1 is contained in the symbol table because it is a structure. At block 720, the live data engine 112 adds entries for the symbol pstruc-child1-gchild1 to the live descendant data table 118 for each ancestor of pstruc-child1-gchild1. Since pstruc-child1-gchild1 has the ancestors pstruc-child1 and pstruc, the live data engine 112 adds two new entries to the live descendant data table 118.

The block 722 includes the blocks 724 and 726. At block 724, the live data engine 112 adds the symbol pstruc-child1-gchild1-ggchild1 (a leaf descendant) to the symbol data table 114. In particular, the live data engine 112 checks whether the symbol pstruc-child1-gchild1-ggchild1 exists in the symbol data table 114. If it does not exist, the live data engine 112 adds the symbol pstruc-child1-gchild1-ggchild1 to the symbol data table 114. Since this symbol does not exist yet in the symbol data table 114, the live data engine 112 inserts the symbol pstruc-child1-gchild1-ggchild1. Furthermore, at block 726, the live data engine 112 adds an entry for the symbol pstruc-child1-gchild1-ggchild1 to the live data table 116 and adds entries for the symbol pstruc-child1-gchild1-ggchild1 to the live descendant data table 118 for each ancestor of pstruc-child1-gchild1-ggchild1 (e.g., pstruc, pstruc-child1, pstruc-child1-gchild1). Note that leaf descendants are added to the symbol data table 114 as the leaf descendants are determined as being live.

Now turning to FIG. 8, method 800 includes blocks 802 and 804, which can correspond to a particular example process deployed within the method 600. Similar to the method 700 of FIG. 7, the live data engine 112 accesses the assignment statement struc-child1=pstruc-child1. However, in the context of FIG. 8, the data structure struc is live with a path to some symbol o_struc; struc-child1 is live with a path to some symbol o_child; and struc-child1 is stored in the live descendants table.

The block 802 includes blocks 802, 810. At block 804, the live data engine 112 determines whether ancestors of the left-hand side are live by checking whether the live data table 116 includes the symbol struc. In this example, struc is live and is included in the live data table 116. At block 806 of block 802, the live data engine 112 determines whether struc-child1 is live by checking whether the live data table 116 includes the symbol struc-child1. Here, struc-child1 is live. At block 808 of block 802, the live data engine 112 determines whether descendants of the left-hand side are live. For this purpose, the live data engine 112 checks whether the live descendant data table 118 includes entries for the descendants. Here, the descendants are not live and do not have corresponding entries in the live descendant data table 118.

The block 810 includes blocks 812 and 814. At block 812, the live data engine 112 adds the symbol pstruc-child1 with a path to o_struc to the live data table 116 in response to the determination that the symbol struc is live. Further, the live data engine 112 adds the symbol pstruc-child1 with a path to o_child to the live data table 116 in response to the determination that the symbol struc-child1 is live. As such, the symbol pstruc-child1 becomes live and is included twice in the live data table 116. At block 814, the live data engine 112 adds an entry to the live descendant data table 118 for the symbol pstruc-child1.

In the context of FIG. 6, the method 800 does not proceed to blocks 810 (and there is no block corresponding to block 718 of method 700) because there are no live descendants of struc-child1. Furthermore, the live data engine 112 does not add a symbol to the symbol data table 114 because the symbol pstruc-child1 is not a leaf descendant.

Figure 9:
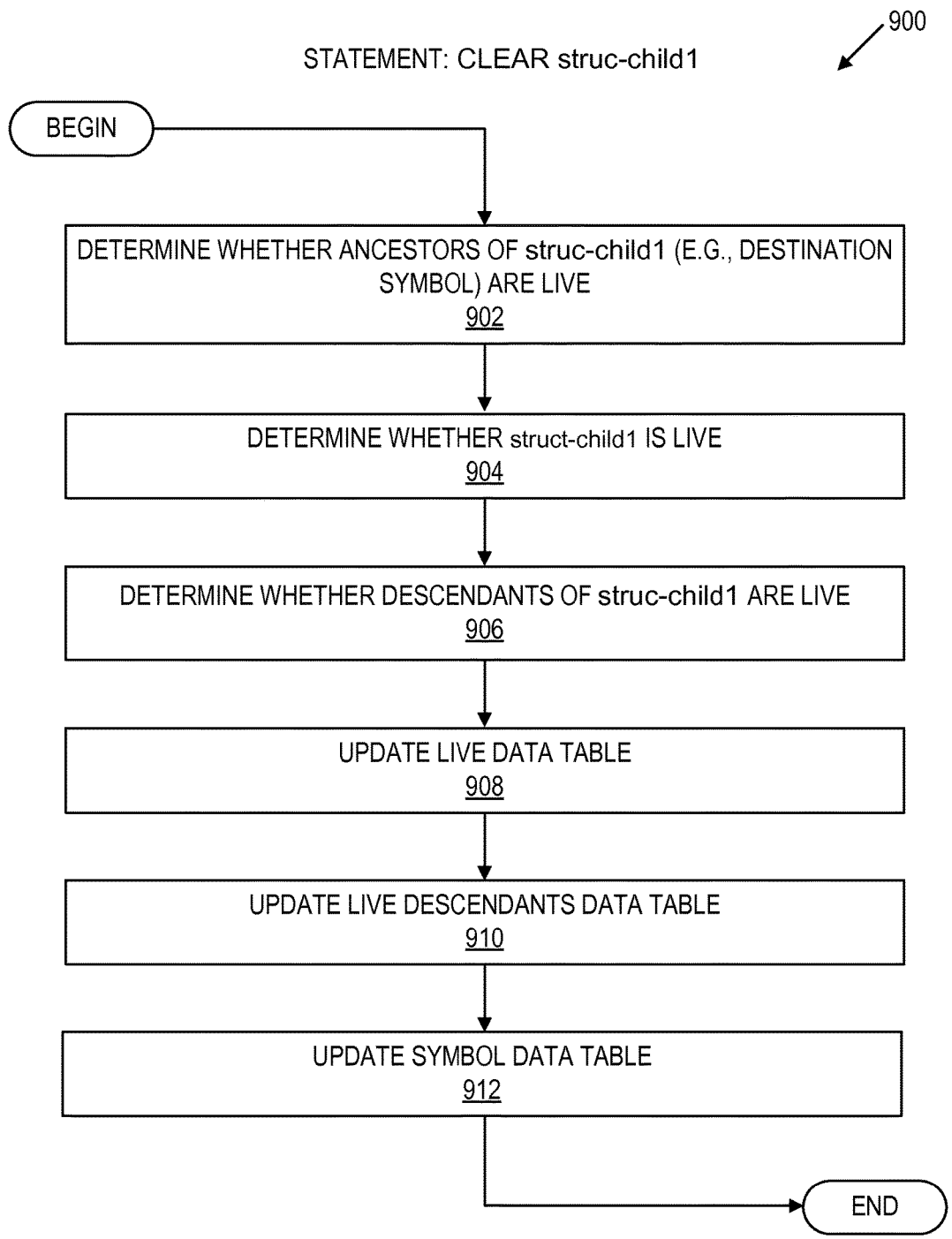

FIG. 9 is a flow diagram illustrating a method 900, in accordance with example embodiments, of updating a symbol data table 114 used within the code analysis system 100 of FIG. 1. Throughout the description of FIG. 9, struc is used as an example data structure. The data structure struc has the hierarchy of the data structure 200 shown in FIG. 2.

Method 900 includes blocks 902-912. In particular, the method 900 begins upon the live data engine 112 accessing a CLEAR instruction: CLEAR struc-child1. Such a clear statement can be used explicitly in the application code or may implicitly be part of some other ABAP statement. For example, such a CLEAR instruction can be part of the assignment statement struc-child1=pstruc-child1 because the left hand side is overwritten. It will be appreciated, however, that the CLEAR instruction can also occur independently of an assignment statement. In what follows, the symbol where the CLEAR operates on can be denoted as the LHS symbol. As was described in connection with FIG. 7, struc-child1 is live with a path to a symbol o_child; struc-child1-gchild1 is live with a path to a symbol o_gchild; struc-child1-gchild1-ggchild1 is live with a path to a symbol o_ggchild; and struc itself is not live.

At block 902, the live data engine 112 determines whether ancestors of the symbol struc-child1 are live via the live data table 116. Here, struc is not live. At block 904, the live data engine 112 determines whether the LHS symbol (e.g., struc-child1) is live via the live data table 116. Here, struc-child1 is live. At block 906, the live data engine 112 determines, using the live descendant data table 118, whether the descendants of the LHS symbol are live. At block 908, the live data engine 112 deletes the entries of the live data table 116 that correspond to the LHS if it is live and entries that correspond to the live descendants. Additionally, at block 910, the live data engine 112 deletes the entries of the live descendant data table 118 that correspond to the LHS if it is live and entries that correspond to the live descendants. Here, entries corresponding to struc-child1-gchild1 and struc-child1-gchild1-ggchild1 are deleted from the live data table 116 and the live descendant data table 118. At block 912, the live data engine 112 updates the symbol data table 114. Here, the symbol data table is not changed. The processing of the statement completes.

A second illustrative case of method 900 is described below. In the new example, the data structure struc is live with a path to some symbol o_struc; struc-child1 is live with a path to some symbol o_child; and struc-child1 is stored in the live descendants table. In this case, the live data engine 112 determines whether any ancestors of the LHS are live. Here, struc is live. Furthermore, the live data engine 112 determines whether the LHS symbol is live. Here, struc-child1 is live. Next, using the live descendant data table 118, the live data engine 112 determines whether any descendants of the LHS symbol are live. Here, there are no live descendants of struc-child1.

Since the LHS symbol is cleared by the statement, the ancestors of the LHS symbol do not stay live, but their other children become live. Here, the LHS symbol has the live parent struc. Accordingly, all the children of struc except struc-child1 become live with a path to symbol o_struc. All these children are inserted into the symbol data table 114 (if they are not there already) and into the live data table 116 and the live descendant data table 118. Processing of the children of these children can be omitted.

Since the LHS symbol struc-child1 is live, the live data engine 112 deletes the LHS symbol from the live data table 116. The live data engine 112 also deletes the entries from the live descendant data table 118 where the LHS symbol occurs as descendant.

Since an ancestor of the left hand side symbol is live, the live data engine 112 deletes the live ancestor from the live data table 116. Furthermore, if this ancestor occurs as a descendant in the live descendant data table 118, the live data engine 112 deletes the corresponding entries from that table. The processing of the statement completes.

As described above in connection with FIG. 9, siblings of the cleared child become live. This may result in new symbols being inserted into the symbol data table 114, the live data table 116, and the live descendant data table 118. This may seem to impede keeping the symbol data table 114 as small as possible. However, in example embodiments this is seldom the case. In many cases, only a few children of a structure influence a security-relevant statement and only these few children occur as target symbols of a data flow path, not the entire structure. Also note that the children of the siblings may not be inserted into the symbol data table 114.

In some example embodiments, the live data engine 112 works for arbitrarily nested structures. For example, consider the instruction: CLEAR struc-child1-gchild1. Also, the structure struc is live with a path to some symbol o_struc; struc-child1 is live with a path to some symbol o_child; and struc-child1 is stored in the live descendant data table 118.

In this case, the live data engine 112 determines whether any ancestors of the LHS (e.g., struc-child1-gchild1) are live. Here, struc-child1 and struc are live. Furthermore, the live data engine 112 determines whether the LHS symbol is live. Here, the LHS symbol is not live.

Using the live descendant data table 118, the live data engine 112 determines whether any descendants of the LHS symbol are live. Here, the LHS symbol does not have any live descendants.

Because the LHS is being cleared by the statement, the ancestors of the LHS symbol do not stay live, but their other children become live. Here, the LHS symbol has the live parent struc-child1. Accordingly, all children of struc-child1 except struc-child1-gchild1 become live. The live data engine 112 inserts the symbol struc-child1-gchild2 into the live data table 116 with a path to symbol o_child. Furthermore, the live data engine 112 inserts entries into the live descendant data table 118 for each of the two ancestors of struc-child1-gchild2 (i.e., an entry each for struc and struc-child1). Moreover, since the ancestor struc is also live, the live data engine 112 inserts the symbol struc-child1-gchild2 into the live data table 116 with a path to symbol o_struc.

Additionally, because the ancestor struc is live, all children of struc except child1 become live. The live data engine 112 inserts the symbol struc-child2 into the live data table 116 with a path to symbol o_struc. Furthermore, for the symbol struc-child2, the live data engine 112 inserts an entry into the live descendant data table 118.

Since struc-child1 is live, the live data engine 112 deletes struc-child1 from the live data table 116. Also, the live data engine 112 deletes all entries from the live descendant data table 118 where struc-child1 occurs as a descendant. Furthermore, because struc is live, the live data engine 112 deletes the symbol struc from the live data table 116. The processing of the statement completes.

In example embodiments, ABAP allows an elementary variable (e.g., a symbol without children) to be assigned to a structure; the content of the elementary variable (input_var in the example below) is split up according to the lengths of the children of the structure. In the following example, struc1 and struc2 are of the same structure type. The live data engine 112 accesses the following statements:

struc1=input_var
struc2=struc1
struc2-child_n=constant

In the last statement, child_n is overwritten with a constant. Thus, all other children of struc2 become live. The preceding assignment has the effect that children of struc1 except child_n become live. When the traversal of the intermediate representation reaches the first assignment, an optimization is performed that consists of creating just one resulting data flow path from input_var to struc2, which replaces the individual paths for each child of the structure type (except child_n).

Certain embodiments are described herein as including logic or a number of components, modules, or mechanisms. Modules can constitute either software modules (e.g., code embodied (1) on a non-transitory machine-readable medium or (2) in a transmission signal) or hardware-implemented modules. A hardware-implemented module is a tangible unit capable of performing certain operations and can be configured or arranged in a certain manner. In example embodiments, one or more computer systems (e.g., a standalone, client or server computer system) or one or more processors can be configured by software (e.g., an application or application portion) as a hardware-implemented module that operates to perform certain operations as described herein.

In various embodiments, a hardware-implemented module can be implemented mechanically or electronically. For example, a hardware-implemented module can comprise dedicated circuitry or logic that is permanently configured (e.g., as a special-purpose processor, such as a field programmable gate array (FPGA) or an application-specific integrated circuit (ASIC)) to perform certain operations. A hardware-implemented module can also comprise programmable logic or circuitry (e.g., as encompassed within a general-purpose processor or other programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) can be driven by cost and time considerations.

Accordingly, the term "hardware-implemented module" should be understood to encompass a tangible entity, be that an entity that is physically constructed, permanently configured (e.g., hardwired) or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor can be configured as different hardware-implemented modules at different times. Software can accordingly configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules can be regarded as being communicatively coupled. Where multiple of such hardware-implemented modules exist contemporaneously, communications can be achieved through signal transmission (e.g., over appropriate circuits and buses that connect the hardware-implemented modules). In embodiments in which multiple hardware-implemented modules are configured or instantiated at different times, communications between such hardware-implemented modules can be achieved, for example, through the storage and retrieval of information in memory structures to which the multiple hardware-implemented modules have access. For example, one hardware-implemented module can perform an operation, and store the output of that operation in a memory device to which it is communicatively coupled. A further hardware-implemented module can then, at a later time, access the memory device to retrieve and process the stored output. Hardware-implemented modules can also initiate communications with input or output devices, and can operate on a resource (e.g., a collection of information).

The various operations of example methods described herein can be performed, at least partially, by one or more processors that are temporarily configured (e.g., by software) or permanently configured to perform the relevant operations. Whether temporarily or permanently configured, such processors can constitute processor-implemented modules that operate to perform one or more operations or functions. The modules referred to herein can, in some example embodiments, comprise processor-implemented modules.

Similarly, the methods described herein can be at least partially processor-implemented. For example, at least some of the operations of a method can be performed by one or processors or processor-implemented modules. The performance of certain of the operations can be distributed among the one or more processors, not only residing within a single machine, but deployed across a number of machines. In some example embodiments, the processor or processors can be located in a single location (e.g., within a home environment, an office environment or a server farm), while in other embodiments the processors can be distributed across a number of locations.

The one or more processors can also operate to support performance of the relevant operations in a "cloud computing" environment or as a "software as a service" (SaaS). For example, at least some of the operations can be performed by a group of computers (as examples of machines including processors), these operations being accessible via a network (e.g., the Internet) and via one or more appropriate interfaces (e.g., Application Program Interfaces (APIs)).

Example embodiments can be implemented in digital electronic circuitry, in computer hardware, firmware, or software, or in combinations of them. Example embodiments can be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations can be performed by one or more programmable processors executing a computer program to perform functions by operating on input data and generating output. Method operations can also be performed by, and apparatus of example embodiments can be implemented as, special purpose logic circuitry, e.g., an FPGA or an ASIC.

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that that both hardware and software architectures require consideration. Specifically, it will be appreciated that the choice of whether to implement certain functionality in permanently configured hardware (e.g., an ASIC), in temporarily configured hardware (e.g., a combination of software and a programmable processor), or in a combination of permanently and temporarily configured hardware can be a design choice. Below are set out hardware (e.g., machine) and software architectures that can be deployed, in various example embodiments.

Figure 10:
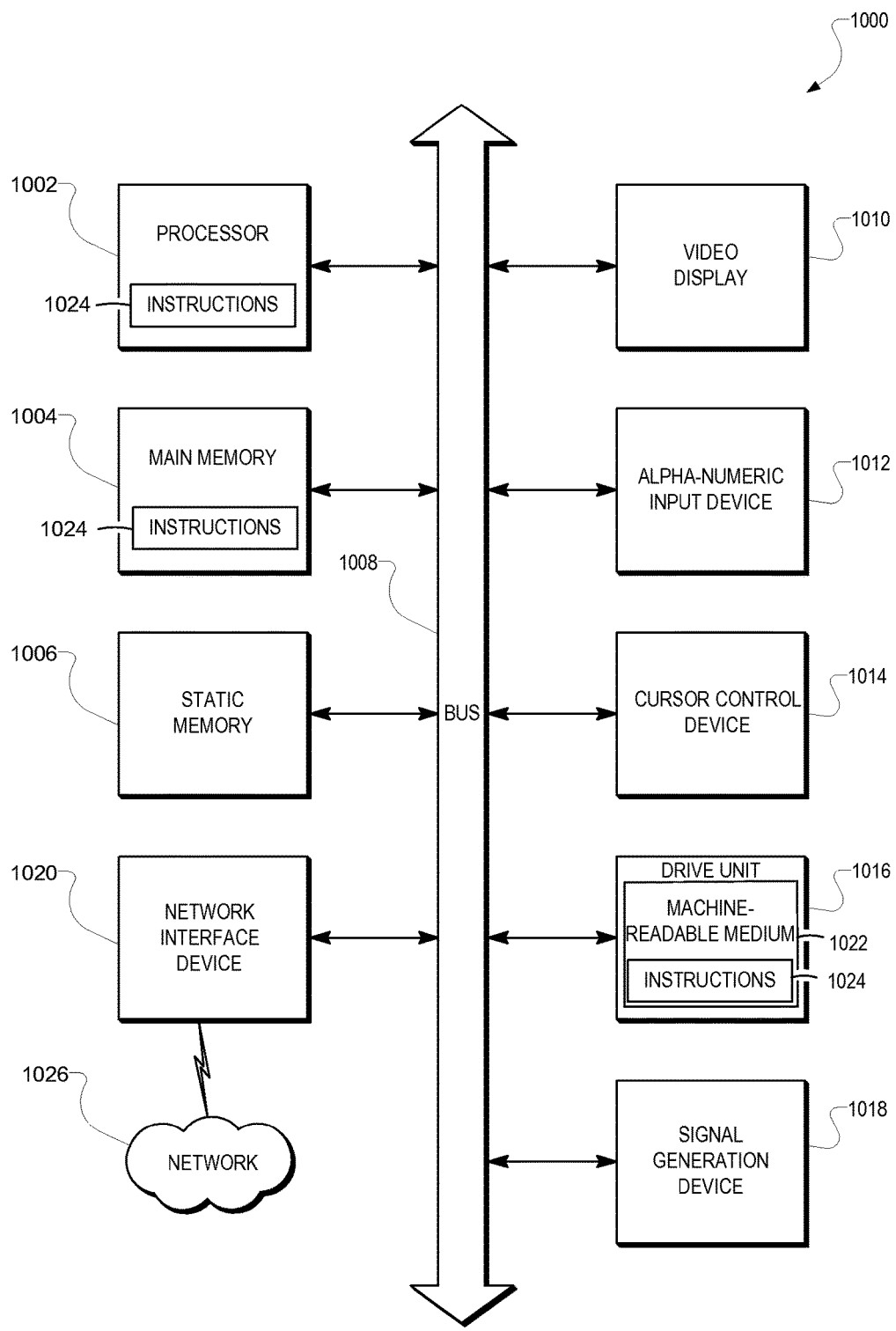
FIG. 10 is a block diagram of a machine in the example form of a computer system within which instructions, for causing the machine to perform any one or more of the methodologies discussed herein, can be executed.

FIG. 10 is a block diagram of machine in the example form of a computer system 1000 within which instructions, for causing the machine to perform any one or more of the methodologies discussed herein, can be executed. In alternative embodiments, the machine operates as a standalone device or can be connected (e.g., networked) to other machines. In a networked deployment, the machine can operate in the capacity of a server or a client machine in server-client network environment, or as a peer machine in a peer-to-peer (or distributed) network environment. The machine can be a personal computer (PC), a tablet PC, a set-top box (STB), a personal digital assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1000 includes a processor 1002 (e.g., a central processing unit (CPU), a graphics processing unit (GPU), or both), a main memory 1004, and a static memory 1006, which communicate with each other via a bus 1008. The computer system 1000 can further include a video display 1010 (e.g., a liquid crystal display (LCD) or a cathode ray tube (CRT)). The computer system 1000 also includes an alphanumeric input device 1012 (e.g., a keyboard or a touch-sensitive display screen), a cursor control device 1014 (e.g., a mouse), a drive unit 1016, a signal generation device 1018 (e.g., a speaker), and a network interface device 1020.

The drive unit 1016 includes a machine-readable medium 1022 on which is stored one or more sets of instructions (e.g., software) 1024 embodying or utilized by any one or more of the methodologies or functions described herein. The instructions 1024 can also reside, completely or at least partially, within the main memory 1004 and/or within the processor 1002 during execution thereof by the computer system 1000, with the main memory 1004 and the processor 1002 also constituting machine-readable media.

While the machine-readable medium 1022 is shown in an example embodiment to be a single medium, the term "machine-readable medium" can include a single medium or multiple media (e.g., a centralized or distributed database, and/or associated caches and servers) that store the one or more instructions 1024 or data structures. The term "machine-readable medium" shall also be taken to include any tangible medium that is capable of storing, encoding or carrying instructions 1024 for execution by the machine and that cause the machine to perform any one or more of the methodologies of the present disclosure or that is capable of storing, encoding or carrying data structures utilized by or associated with such instructions 1024. The term "machine-readable medium" shall accordingly be taken to include, but not be limited to, solid-state memories, and optical and magnetic media. Specific examples of machine-readable media 1022 include non-volatile memory, including by way of example semiconductor memory devices, e.g., erasable programmable read-only memory (EPROM), electrically erasable programmable read-only memory (EEPROM), and flash memory devices; magnetic disks such as internal hard disks and removable disks; magneto-optical disks; and CD-ROM and DVD-ROM disks.

The instructions 1024 can further be transmitted or received over a communications network 1026 using a transmission medium. The instructions 1024 can be transmitted using the network interface device 1020 and any one of a number of well-known transfer protocols (e.g., HTTP). Examples of communication networks include a local area network (LAN), a wide area network (WAN), the Internet, mobile telephone networks, plain old telephone (POTS) networks, and wireless data networks (e.g., WiFi and WiMax networks). The term "transmission medium" shall be taken to include any intangible medium that is capable of storing, encoding or carrying instructions 1024 for execution by the machine, and includes digital or analog communications signals or other intangible media to facilitate communication of such software.

Although an embodiment has been described with reference to specific example embodiments, it will be evident that various modifications and changes can be made to these embodiments without departing from the broader spirit and scope of the disclosure. Accordingly, the specification and drawings are to be regarded in an illustrative rather than a restrictive sense. The accompanying drawings that form a part hereof show by way of illustration, and not of limitation, specific embodiments in which the subject matter can be practiced. The embodiments illustrated are described in sufficient detail to enable those skilled in the art to practice the teachings disclosed herein. Other embodiments can be utilized and derived therefrom, such that structural and logical substitutions and changes can be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter can be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose can be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A method of performing data flow analysis on computer code, the method comprising:
in response to accessing a computer code statement referencing destination and source data structures having related hierarchies, determining whether first components of the hierarchy of the destination data structure are included in a live data table, the first components of the hierarchy of the destination data structure including a destination ancestor of the destination data structure;
using one or more hardware processors, determining whether a second component of the hierarchy of the destination data structure is included in a live descendant data table, the second component of the hierarchy of the destination data structure including a destination leaf-descendant of the destination data structure;
in response to either the destination ancestor or the destination data structure being included in the live data table, updating the live data table to include the source data structure;
in response to the destination leaf-descendant being included in the live descendant data table, updating the live data table and a symbol data table to include a leaf-descendant of the source data structure that corresponds to the destination leaf-descendant, thereby resulting in a symbol table that contains only those destination leaf-descendants that can impact static code analysis;
identifying a security pattern risk based on static analysis of the live data table and the symbol data table; and
generating an indication, for display on a display device, of the identified security pattern.

2. The method of claim 1, wherein the computer code statement corresponds to intermediate code generated from source code.

3. The method of claim 1, wherein the live data table includes a record corresponding to a symbol that is live at a current position during the traversal of the computer code.

4. The method of claim 3, wherein the record includes a symbol identifier data field, a target identifier data field, a first edge identifier, and a path length data field.

5. The method of claim 1, wherein the live descendant data table includes a record that represents a pair of an ancestor and a descendant of a data structure.

6. The method of claim 5, wherein the record comprises an ancestor identifier data field, a descendant identifier data field, and a kinship degree data field.

7. The method of claim 6, wherein the ancestor identifier data field and the descendant identifier data field of the record form a unique key into the live descendant data table.

8. The method of claim 1, wherein the destination leaf-descendant corresponds to a data structure that includes no other data structures.

9. The method of claim 1, wherein the computer code statement referencing destination and source data structures corresponds to an assignment statement transferring data from the source data structure to the destination data structure.

10. The method of claim 1, wherein in further response to either the destination ancestor or the destination data structure being included in the live data table, updating the live descendant data table to include ancestors of the data structures being included in the live data table.

11. A system comprising:
a live data engine, including one or more hardware processors, configured to: in response to accessing a computer code statement referencing destination and source data structures having related hierarchies, determine whether first components of the hierarchy of the destination data structure are included in a live data table, the first components of the hierarchy of the destination data structure including a destination ancestor of the destination data structure;
determine whether a second component of the hierarchy of the destination data structure is included in a live descendant data table, the second component of the hierarchy of the destination data stricture including a destination leaf-descendant of the destination data structure;
in response to either the destination ancestor or the destination data structure being included in the live data table, update the live data table to include the source data structure; and
in response to the destination leaf-descendant being included in the live descendant data table, update the live data table and a symbol data table to include a leaf-descendant of the source data structure that corresponds to the destination leaf-descendant, thereby resulting in a symbol that contains only those destination leaf-descendants that can impact static code analysis;
identifying a security pattern risk based on static analysis of the live data table and the symbol data table; and
generating an indication, for display on a display device, of the identified security pattern.

12. The system of claim 11, wherein the computer code statement corresponds to intermediate code generated from source code.

13. The system of claim 11, wherein the live data table includes a record corresponding to a symbol that is live at a current position during a traversal of the computer code.

14. The system of claim 13, wherein the record includes a symbol identifier data field, a target identifier data field, a first edge identifier, and a path length data field.

15. The system of claim 11, wherein the live descendant data table includes a record that represents a pair of an ancestor and a descendant of a data structure.

16. A non-transitory machine-readable storage medium embodying instructions that, when executed by a machine, cause the machine to perform operations comprising:
in response to accessing a computer code statement referencing destination and source data structures, both the destination and source data structures having related hierarchies, determining whether first components of the hierarchy of the destination data structure are included in a live data table, the first components of the hierarchy of the destination data structure including a destination ancestor of the destination data structure, using one or more hardware processors, determining whether a second component of the hierarchy of the destination data structure is included in a live descendant data table, the second component of the hierarchy of the destination data structure including a destination leaf-descendant of the destination data structure;
in response to either the destination ancestor or the destination data structure being included in the live data table, updating the live data table to include the source data structure;
in response to the destination leaf-descendant being included in the live descendant data table, updating the live data table and a symbol data table to include a leaf-descendant in the hierarchy of the source data structure that corresponds to the destination leaf-descendant, thereby resulting in a symbol table that contains only those destination leaf-descendants that can impact static code analysis;

identifying a security pattern risk based on static analysis of the live data table and the symbol data table; and generating an indication, for display on a display device, of the identified security pattern.

17. The non-transitory machine-readable storage medium of claim 16, wherein the computer code statement corresponds to intermediate code generated from source code.

18. The non-transitory machine-readable storage medium of claim 16, wherein the live data table includes a record corresponding to a symbol that is live at a current position during a traversal of the computer code.

19. The non-transitory machine-readable storage medium of claim 18, wherein the record includes a symbol identifier data field, a target identifier data field, a first edge identifier, and a path length data field.

20. The non-transitory machine-readable storage medium of claim 16, wherein the live descendant data table includes a record that represents a pair of an ancestor and a descendant of a data structure.

* * * * *